Figure 1:
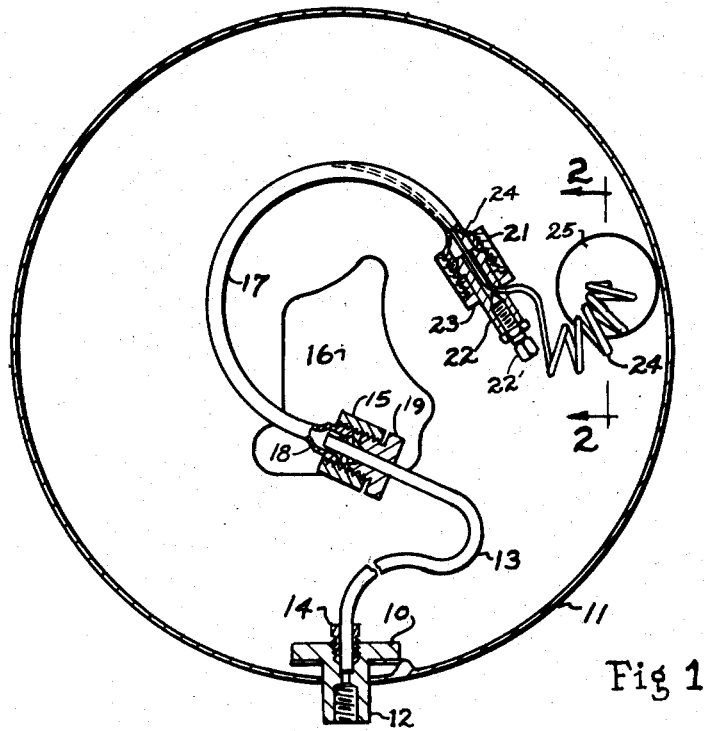

Oct. 27, 1953     O. W. HEISE     2,656,723

BOURDON TUBE GAUGE

Filed Dec. 20, 1950

INVENTOR.

OTTO W. HEISE

BY Paul M. Crist

Patented Oct. 27, 1953

2,656,723

UNITED STATES PATENT OFFICE 2,656,723

BOURDON TUBE GAUGE

Otto W. Heise, Newtown, Conn.

Application December 20, 1950, Serial No. 201,773

5 Claims. (Cl. 73—418)

1

This invention relates to pressure gauges of the Bourdon tube type, and particularly to a new and improved device for insuring the complete removal of air from the Bourdon tube when the gauge is used to measure the pressure of a liquid.

Various methods have been employed in the past to vent Bourdon tubes and many of them fulfilled, to an extent, the purposes for which they were designed. Invariably, however, they all failed to vent the tube completely. Trapping, or the accumulation of any air within the Bourdon tube sets up a condition wherein the tube action varies considerably over its range of movement relatively to its action when the tube is completely vented. When the gauge is first calibrated at the factory, its tube is completely vented. Consequently, subsequent use of the gauge with entrapped air in the tube produces inaccurate readings. Additionally, when entrapped air accumulates in a Bourdon tube, sudden reversals of pressure cause wild fluctuations of the tube end with consequent danger of damage to the delicate multiplying mechanism. Another very important reason for requiring complete venting of the Bourdon tube is that air bubbles often form within the connecting tube that leads to the Bourdon tube. The passage through this connecting tube is usually of much smaller diameter than the Bourdon tube, and consequently bubbles that form therein provide a resistance to the flow of liquid in the connecting tube because of the force required to overcome the adhesion of an apparent "skin" of the bubble to the sides of the connecting tube. In other words, a meniscus-like condition is encountered when bubbles form in the connecting tube that absorbs a certain amount of the force applied by the medium being measured in moving the liquid in the connecting tube. Accordingly, extremely accurate pressure measurements under these conditions are unobtainable.

The principal object of this invention is to provide a construction that will completely vent the tube of a Bourdon gauge without in any way affecting the delicate movement of the free end of the tube.

Other objects include the provision of a Bourdon tube gauge embodying a venting device for the tube that can be operated without dismantling the gauge; the provision of such a gauge in which the venting device can, with facility, be located at any convenient point of the gauge housing such as, for example, at any location on the back or side of the gauge housing, and even remotely from the gauge, as for example on the front of a panel board supporting the gauge; and

2 the provision of such a gauge in which the venting device cooperates with the tube's free end in a manner permitting its ready removal for purposes of cleaning and flushing of the tube.

Figure 2:
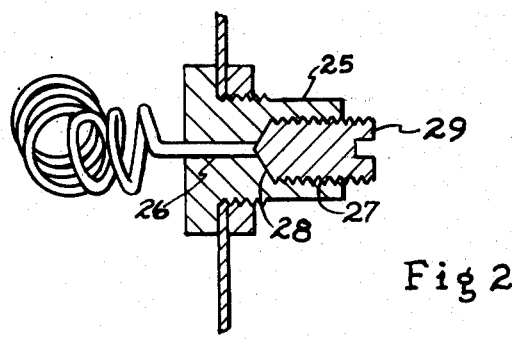

The above, other objects and novel features of the invention will become apparent from the following specification and accompanying drawing in which:

Figure 1 is a front elevational view of a Bourdon tube gauge embodying the principles of the invention. Certain parts have been omitted to show others; and Figure 2 is a sectional elevation view taken along line 2—2 of Fig. 1.

Referring to Fig. 1, an inlet 10 is mounted within the housing 11 of the gauge with a portion 12 extending through the housing wall to which a connection is made with the vessel containing a medium, the pressure of which is to be measured. A curved connecting tube 13 is connected to the inlet 10 by a union fitting 14. A threaded socket 15 is attached to a casting 16 that is firmly anchored to the back of the gauge housing 11. The Bourdon tube 17 is of conventional design, having an enlarged end 18 threaded into one end of the socket 15. The curved tube 13 has its one end extending through the socket 15 and projecting into the enlarged end 18 of tube 17. The internal diameter of tube 13 is of a much smaller value than that of tube 17. A compression nut 19 acts upon a compression sleeve to firmly hold tube 13 in sealing relation to the Bourdon tube 17.

The opposite end of the Bourdon tube 17 is also enlarged and threaded to receive a threaded sleeve 21. A union nipple 22 having a conical seat is held in sealing relation with a mating seat formed at the free end of the tube 17 by a nut 23. The nipple 22 is provided with a relatively small hole extending throughout its length, which is counterbored and threaded to receive a venting screw 22'. A supplementary vent including a very fine, hollow tube 24 passes through the side wall of nipple 22 and is hermetically sealed thereto. The small hollow tube 24 extends inwardly of the tube 17 to a point where its inlet end within the tube is at the highest elevation within tube 17 when the tube is in its normal position for use. The remainder of the hollow tube 24 is coiled in the form of a coil spring having sufficient convolutions to permit its outlet end to be located at any convenient point within the housing 11, or even to extend outwardly of such housing and still permit the free, uninhibited action of the free end of tube 17.

Although the outer end of tube 24 may be located with facility at any convenient point within or without the housing 11, it is shown by way of example as being attached to a fitting 25 (Fig. 2) that is mounted on the interior of the back wall of housing 11 and extending outwardly therefrom. The fitting 25 includes a bore 26 and a threaded counterbore 27, the bottom of the latter of which forms a conical seat 28. A venting valve 29 is threaded into the counterbore 27 and it includes a conical seat that mates with seat 28.

From the foregoing, it is evident that the venting device, by virtue of the location of the end of tube 24 within tube 17, permits complete venting of the Bourdon tube 17, and that such venting mechanism in no way inhibits the free action of tube 17. Furthermore, it is evident that the venting screw 29 can be operated from the exterior of the gauge housing and even on a panel board supporting the gauge, thereby making it possible to vent the gauge at frequent intervals without dismantling the gauge.

Although the various features of the invention have been shown and described as applied to one embodiment of the invention, it is evident that certain features may be used without others without departing from the principles of the invention.

What is claimed is:

1. In a Bourdon tube gauge, a housing; an inlet; a Bourdon tube connected to said inlet and having a free end opposite the inlet end at a lower elevation when in its normal operating position than other portions of said tube; and vent means having an inlet and an outlet, said inlet being located within said tube at the highest point of elevation therein when said gauge is in its normal operating position.

2. In a Bourdon tube gauge, a housing; an inlet; a Bourdon tube connected to said inlet and having a free end opposite the inlet end at a lower elevation when in its normal operating position than other portions of said tube; a device adapted to be mounted at any point within said housing and extending to the exterior thereof; and a resilient tube extending from said device to the interior of said Bourdon tube and having an inlet at a point therein at the highest elevation within the interior of said tube when said gauge is in its normal operating position.

3. In a Bourdon tube gauge, a housing; an inlet; a Bourdon tube connected to said inlet and having a free end opposite the inlet end at a lower elevation when in its normal operating position than other portions of said tube; a fitting adapted to be located at any convenient point relatively to said gauge; a venting screw in said fitting; and a hollow tube extending from said fitting to a point within said Bourdon tube at the highest point of elevation within said Bourdon tube when said gauge is in its normal operating position.

4. In a Bourdon tube gauge, a housing; an inlet; a Bourdon tube connected to said inlet and having a free end opposite the inlet end at a lower elevation when in its normal operating position than other portions of said tube; a fitting adapted to be located at any convenient point relatively to said gauge; a venting screw in said fitting; and a hollow tube of relatively small diameter compared to that of said Bourdon tube extending from the point of highest elevation within said Bourdon tube to the exterior thereof, said hollow tube being coiled in the form of a spring and attached to said fitting.

5. In a Bourdon tube gauge, a housing; an inlet; a Bourdon tube connected to said inlet and having a free end opposite the inlet end at a lower elevation when in its normal operating position than other portions of said tube; a hollow nipple attached to the free end of said Bourdon tube; a venting screw attached to said nipple; an auxiliary venting device including a coiled hollow tube of smaller outside diameter than the internal diameter of said hollow nipple, the free end of said coiled tube extending through said hollow nipple into said Bourdon tube to the point therein of highest elevation when said gauge is in the position to be used; a fitting adapted to be located at any convenient location relatively to said gauge and to which the opposite end of said coiled tube is connected; and a venting screw within said fitting and accessible from the exterior of said gauge.

OTTO W. HEISE.

References Cited in the file of this patent

UNITED STATES PATENTS

| Number | Name | Date |
|---|---|---|
| 1,322,463 | Nelson | Nov. 18, 1919 |
| 1,363,415 | Hopkins | Dec. 28, 1920 |
| 2,470,714 | Nevius | May 17, 1949 |

FOREIGN PATENTS

| Number | Country | Date |
|---|---|---|
| 87,805 | Germany | Sept. 20, 1895 |
| 111,614 | Germany | July 6, 1900 |
| 218,416 | Great Britain | July 10, 1924 |